United States Patent
Rouyre (10) Patent No.: US 8,066,221 B2
(45) Date of Patent: Nov. 29, 2011

(54) AIRCRAFT VENTRAL FAIRING PARTITION WALL AND AIRCRAFT EQUIPPED WITH A VENTRAL FAIRING

(75) Inventor: Francois Rouyre, Cornebarrieu (FR)

(73) Assignee: Airbus France, Toulouse (FR)

( * ) Notice: Subject to any disclaimer, the term of this patent is extended or adjusted under 35 U.S.C. 154(b) by 792 days.

(21) Appl. No.: 12/096,459

(22) PCT Filed: Nov. 23, 2006

(86) PCT No.: PCT/FR2006/051222
§ 371 (c)(1),
(2), (4) Date: Jul. 28, 2008

(87) PCT Pub. No.: WO2007/066026
PCT Pub. Date: Jun. 14, 2007

(65) Prior Publication Data
US 2008/0283665 A1 Nov. 20, 2008

(30) Foreign Application Priority Data
Dec. 7, 2005 (FR) ...................................... 05 53760

(51) Int. Cl.
*B64C 1/10* (2006.01)
*B64C 1/38* (2006.01)
(52) U.S. Cl. .......................... 244/119; 244/130; 244/131
(58) Field of Classification Search .............. 244/117 R, 244/119, 120, 121, 130, 131
See application file for complete search history.

(56) References Cited

U.S. PATENT DOCUMENTS

| | | | | |
|---|---|---|---|---|
| 5,222,694 A | * | 6/1993 | Smoot | 244/131 |
| 5,542,626 A | * | 8/1996 | Beuck et al. | 244/121 |
| 5,921,593 A | * | 7/1999 | Gassert | 244/118.2 |
| 6,889,939 B2 | * | 5/2005 | Rouyre et al. | 244/131 |
| 7,407,135 B2 | * | 8/2008 | Rouyre | 244/130 |
| 2002/0178583 A1 | | 12/2002 | Holman et al. | |

FOREIGN PATENT DOCUMENTS
EP 1342927 A 9/2003

OTHER PUBLICATIONS
Search Report dated Mar. 14, 2007.

* cited by examiner

*Primary Examiner* — Tien Dinh
*Assistant Examiner* — Richard R Green
(74) *Attorney, Agent, or Firm* — Perman & Green, LLP (57) ABSTRACT

The invention concerns a wall (10) of vertical partitioning for a ventral cowling of an aircraft including a plurality of vertical panels (11, 12, 12', 13, 13'), each panel being linked to an adjacent panel by a vertical post (14, 15, 16). At least one exterior panel (13, 13') is mounted in a fixed manner on at least one associated vertical post (14, 16). The upper end of said vertical post is fitted with a means of fastening in transverse rotation intended to be fixed to the structure (8) of an aircraft, the means of fastening in transverse rotation being capable of allowing the displacement (Dy) of the structure of the aircraft with respect to the fixed partitioning wall. It is also possible for at least one intermediary panel (12, 12') to be mounted floating on at least one associated vertical post (15, 16), in such a way as to have a deflection parallel and perpendicular to the adjacent panels.

10 Claims, 5 Drawing Sheets

AIRCRAFT VENTRAL FAIRING PARTITION WALL AND AIRCRAFT EQUIPPED WITH A VENTRAL FAIRING

The invention concerns a partitioning wall to vertically compartmentalize the internal volume of a ventral cowling, or an underbelly of an aircraft. More precisely, the invention concerns the fastening devices of the partitioning wall which allow said partitioning wall to be linked to the ventral cowling and to the aircraft. The invention also concerns an aircraft fitted with a ventral cowling whose internal volume is compartmentalized by at least one vertical partitioning wall of the invention.

In the field of aeronautics, it is well-known to equip aircraft with a ventral cowling. Generally the ventral cowling, in the form of a cradle, is fitted with a base and two longitudinal panels turning upward laterally on either side of the aircraft fuselage onto which it is mounted. Each panel is equipped with a hollowed-out section capable of allowing one wing of the aircraft wing surface to pass through. The ventral cowling is fastened to the lower portion of the fuselage, at the junction of said fuselage with the aircraft wing surface, in order to seal off the landing gear compartment while possibly increasing the volume downward. Such a ventral cowling fills in the aerodynamic profile of the junction zone between the fuselage and the landing gear compartment, and its particular shape allows the aerodynamic drag it generates to be minimized.

The ventral cowling is generally partitioned, by means of vertical walls, in such a way as to arrange compartments in the internal volume of the ventral cowling. This partitioning has three principal functions.

First of all, this compartmentalization of the internal volume of the ventral cowling into many sub-volumes allows, in the event of the loss of a panel from the outer skin of the ventral cowling, the avoidance of an overload due to the effect of a pressure difference at the other panels of the outer skin, which could otherwise lead to the loss of other panels from the outer skin. Actually, due to the loss of one or several panels from the outer skin of the ventral cowling, air can rush into the internal volume of the cowling. In the absence of partitioning of the inner volume of the cowling by partitioning walls, there is a risk of an underpressure inside the general internal volume of the cowling.

A second function of this compartmentalization of the internal volume of the ventral cowling is to allow the segregation of volumes of said cowling in the event of fumes or fuel vapor, in order for them not to propagate into the entire internal volume interne of the ventral cowling.

Finally, the compartmentalization of the internal volume of the ventral cowling of the partitioning walls ensures the mechanical strength of the aerodynamic shape of the ventral cowling.

When the aircraft is in flight, the panels forming the partitioning walls of the ventral cowling must be able to withstand displacements due to the flexibility of the aircraft. The fuselage effect in particular is known, which leads to bending of the aircraft along the transverse axis Y and thus compressions of the panels of partitioning walls which are oriented along the longitudinal axis X of the aircraft.

Moreover, in flight, the flexing of the wing surface leads to an elongation at the outermost panels of the intrados of the wing surface. Conversely, the ventral cowling, attached to the intrados of the wing surface, must not be subject to any deformation, in order to retain its aerodynamic shape.

The partitioning walls of prior art are a succession of fixed and floating panels, disposed parallel to and perpendicular to the X axis of the aircraft and linked to one another by watertight joints.

However, in the case of an aircraft with large wing span, the fuselage of which can be more than 80 meters in length, the flexing of the wing surface, upward or downward, causes an elongation of the intrados of the wing surface which may be as much as 10 to 15 mm. This elongation is mainly located at the wing box, disposed above the ventral cowling, at the junction between the wing surface and the fuselage of the aircraft. Moreover, due to the considerable length of the fuselage, the risks of compression at the level of the ventral cowling are such that they make the use of longitudinal vertical partitioning walls difficult, that is, extending vertically and parallel to the longitudinal X axis of the aircraft.

The partitioning walls of a ventral cowling of a large-wing-span aircraft, located below the zone of elongation of the wing box, should be capable of accepting the differentials of movement between the ventral cowling, which is and must remain fixed on the aircraft, and the intrados of the wing surface, which can be subject to an elongation of 10 to 15 mm when the aircraft is in flight. The partitioning walls should also be capable of taking up the pressure differences between the compartments.

In the invention, the objective is to provide a ventral cowling which can be used on an aircraft having a fuselage of considerable length, that is, over 50 meters, for example about 80 meters. Another goal of the invention is to provide a partitioning wall for a ventral cowling capable of allowing for transverse elongation of the wing box to which it is fixed. Transverse elongation is understood to be an elongation extending perpendicular to the longitudinal axis X of the aircraft and in a plane parallel to the plane containing said aircraft, that is, an elongation along the transverse axis Y.

For this, the invention proposes using a compartmentalization partition capable of partitioning and of ensuring the mechanical strength of the ventral cowling of the aircraft, while allowing displacement of the lower structure of the fuselage to which said partition is fastened. The compartmentalization partition according to the invention is intended to transversely partition the internal volume of the ventral cowling, that is, to achieve compartments extending perpendicular to the longitudinal axis X of the aircraft. Thus, the compartmentalization partition according to the invention extends in the direction of potential elongation of the lower structure of the fuselage to which it is linked. The compartmentalization partition is rigid and fixed to the ventral cowling in order to hold the structure of the ventral cowling. Conversely, the connection between the compartmentalization partition and the lower structure of the fuselage is flexible in order to allow elongation of said lower structure. The compartmentalization partition according to the invention is formed of a plurality of panels extending vertically from the floor, or the bed, of the ventral cowling as far as the lower surface of the fuselage. The panels forming the partition extend flush with one another in such a way as to divide the ventral cowling in its width. The width of the ventral cowling is understood to be the dimension of said cowling extending along the transverse axis Y of the aircraft.

As elongation of the lower structure of the fuselage occurs mainly in the zone located at the external longitudinal edges of the ventral cowling, the compartmentalization partition according to the invention allows for external panels located at said longitudinal edges, whose connection to the lower structure of the fuselage is transversely pivoting. Transversely pivoting is understood to mean that the connection can swing perpendicular to the longitudinal axis X, to the right and the left of said axis X. The exterior panels of the compartmentalization partition, which are mounted in a fixed manner onto the bed of the cowling, cannot move with respect to said bed. On the other hand, the lower structure of the fuselage, to which the exterior panels of the compartmentalization partition are attached, can move transversely, and in particular can elongate along the transverse axis Y, leading, during this displacement, to the connection pivoting transversely to the right or to the left with respect to its initial position.

The other panels of the compartmentalization partition do not need to have a connection to the lower structure of the fuselage, which allows such a deflection, since the elongation of the lower structure of the fuselage is located mainly at the exterior panels. For example, the connections of the interior panels, located between the exterior panels and the central panel of the compartmentalization partition, are sufficient to permit a slight deflection along the transverse axis Y. The central panel itself may have a perfectly fixed connection with respect to the lower structure of the fuselage, since it is located at the level of the part of the lower structure of the fuselage which is not subject to any elongation, as it is located on the X axis of the aircraft.

The invention therefore has as its objective a vertical partitioning wall for an aircraft ventral cowling including a plurality of vertical panels, each panel being attached to an adjacent panel by means of a vertical post, characterized by the fact that at least one exterior panel, located at one end of the partitioning wall, is mounted in a fixed manner on at least one associated vertical picket, the upper end of said associated vertical picket being fitted with a means of fastening in transverse rotation intended to be fixed to the structure of an aircraft, the means of fastening in transverse rotation being capable of allowing the displacement of the aircraft structure with respect to the fixed partitioning wall.

Transverse rotation is understood to be a rotation about an axis extending parallel to the longitudinal axis X of the aircraft, perpendicular to the partitioning wall.

According to the embodiment examples of the invention, it is possible to provide all or parts of the following additional characteristics:

At least one vertical post associated with an exterior panel comprises a means of fastening in translation intended to be linked to the structure of the aircraft in such a way as to take up the axial forces to which the panel is subjected.

Fastening in translation is understood to mean that the means of fastening can have a rectilinear motion parallel to the longitudinal axis X.

At least one intermediary panel, disposed between an exterior panel and a central panel, is mounted floating on at least one associated vertical post in such a way as to have deflection parallel to and perpendicular to the adjacent panels.

Floating is understood to mean that the intermediary panel is not linked in a fixed and locked manner to the associated vertical post, but on the contrary, although kept in position by said associated vertical panel, the intermediary panel can oscillate back and forth and from right to left, within limits that depend on the associated vertical post itself.

The upper end and the lower end of at least one vertical post associated with an intermediary panel are fitted with means of fastening in axial rotation, intended to be fixed respectively to the structure of the aircraft and to the ventral cowling.

Axial rotation is understood to be a rotation about an axis extending parallel to the transverse axis Y of the aircraft and allowing for swinging from forward to back with respect to the longitudinal axis X.

The partitioning wall comprises a central panel mounted on a fixed manner on two associated vertical posts that frame it.

The invention also concerns an aircraft fitted with a ventral cowling including at least one partitioning wall according to the invention and located below the wing box of the aircraft, at the junction between the wing surface and the fuselage of the aircraft, in which the vertical panels of the partitioning wall are mounted in a fixed manner onto the bed of the ventral cowling.

According to the embodiment examples of the aircraft, it is possible to provide all or parts of the following additional characteristics:

The upper end of at least one vertical post associated with an exterior panel of the partitioning wall is mounted in transverse rotation onto the wing box of the aircraft, in such a way as to allow the elongation of said wing box perpendicular to the longitudinal axis of the aircraft.

At least one vertical post associated with an exterior panel of the partitioning wall is linked in translation to the wing box, in such a way as to take up the axial forces to which said exterior panel is subjected.

The upper end and the lower end of at least one vertical post associated with an intermediary panel of the vertical partitioning wall are mounted in axial rotation, respectively, onto the wing box and onto the bed of the ventral cowling, in such a way as to take up the axial forces to which said intermediary panel is subjected.

The partitioning wall is linked to the wing box by means of longitudinal beams extending parallel to the longitudinal axis of the aircraft. More precisely, fittings disposed beneath the beams provide the connection between the panels of the partitioning wall and the beams of the intrados of the wing box.

The ventral cowling is fitted with two vertical partitioning walls according to the invention, said partitioning walls extending on either side of the wing box of the aircraft, perpendicular to the longitudinal axis of the aircraft and parallel to the transverse axis of said aircraft.

The invention will be better understood upon reading the description that follows and upon examination of the figures that accompany it. These are presented in an indicative manner, in no way limiting the invention. The figures depict.

Figure 1:
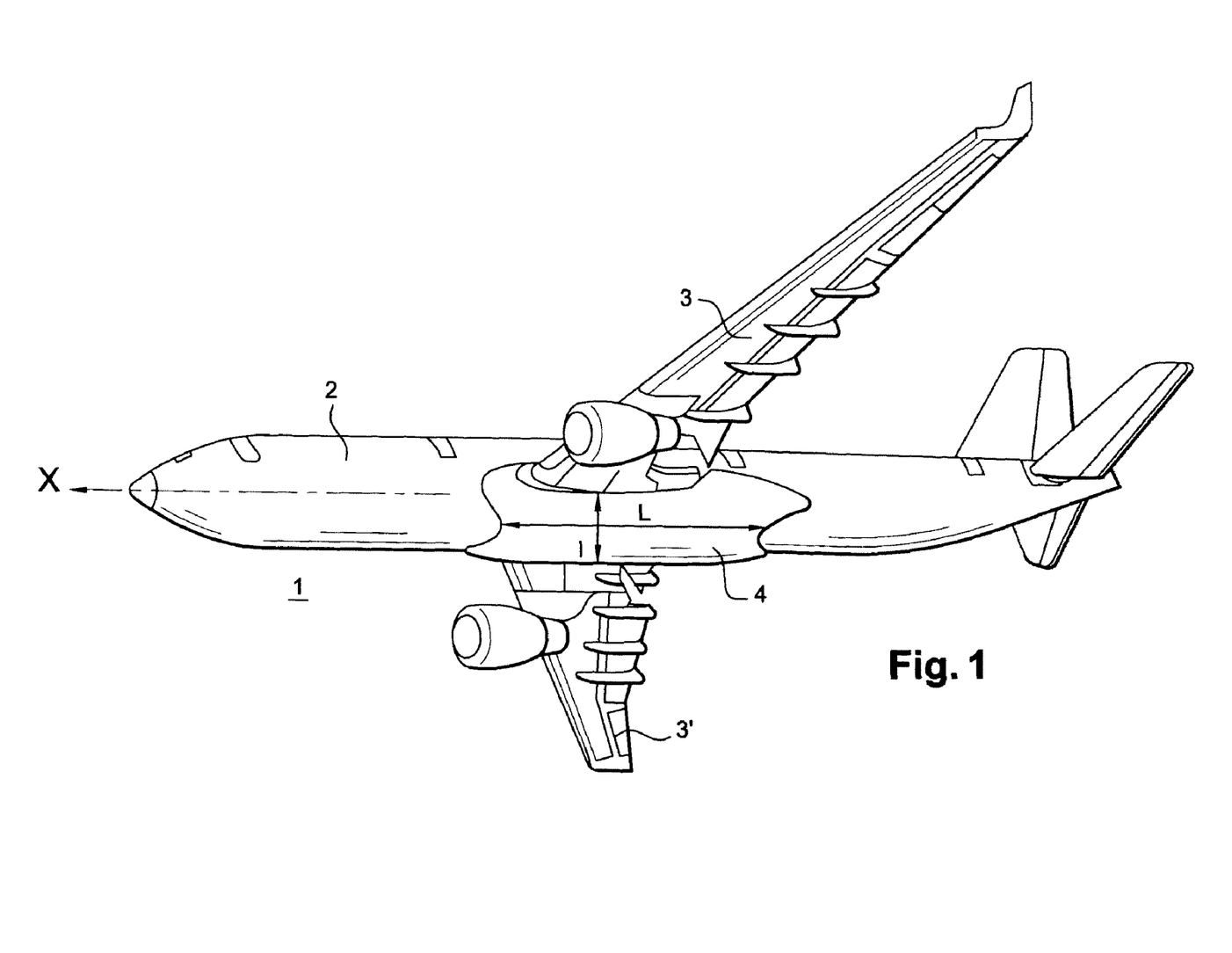
FIG. 1: an aircraft fitted with a ventral cowling.
Figure 2:
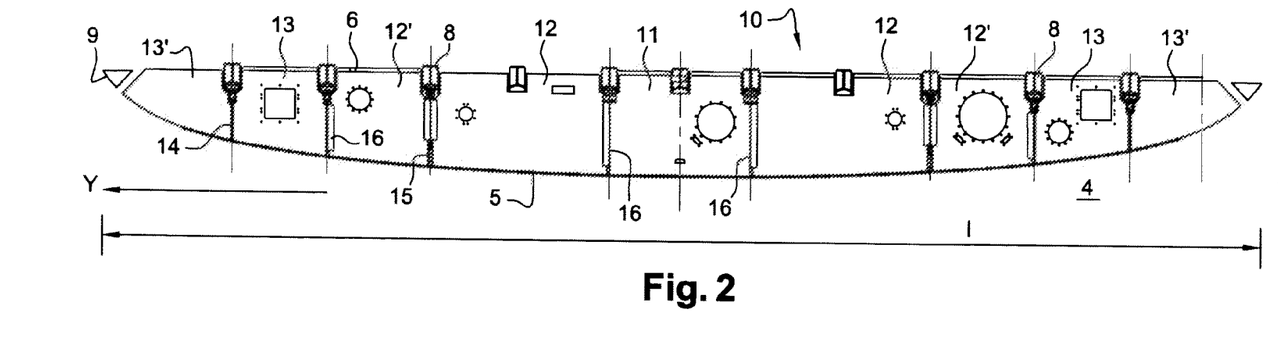
FIG. 2: a cross-section of a ventral cowling at the level of a partitioning wall according to the invention.

FIG. 1 represents an aircraft 1 including a fuselage 2 and a wing surface 3, 3'. A ventral cowling 4 is fixed to the lower part of the fuselage 2, at the junction between the fuselage 2 and the wing surface 3, 3'. The ventral cowling 4 extends the length of the fuselage 2. The length of the fuselage is understood to be the dimension of the fuselage extending parallel to the longitudinal axis X of the aircraft 1. The length L of the ventral cowling 4 is the dimension of said cowling 4 extending parallel to the X axis. The width I of the ventral cowling 4 is the dimension of said cowling 4 extending between the two wings 3, 3' of the wing surface, perpendicular to the length L of said cowling 4. The width I of the cowling 4 extends parallel to the transverse axis Y (FIG. 2).

The ventral cowling 4 has a fixed length L and a fixed width I, that is, which do not tend to be modified during the use of the aircraft 1.

Conversely, the wing box of the aircraft 1 (not shown in FIG. 1), located in the internal volume of the ventral cowling 4, between the two wings 3, 3', can be elongated in directions perpendicular to the longitudinal axis X and parallel to the transverse axis Y, by reason of the flexing of the wing surface 3, 3'.

Also, the zone of connection between the ventral cowling 4 and the wing box must allow this movement differential. The connection between the ventral cowling 4 and the wing box is achieved by one or several partitioning walls (not shown in FIG. 1) which vertically compartmentalize the internal volume of the ventral cowling 4. The connection between this or these wall(s) and the wing box must be flexible in order to allow for the elongation of said wing box.

Figure 3:
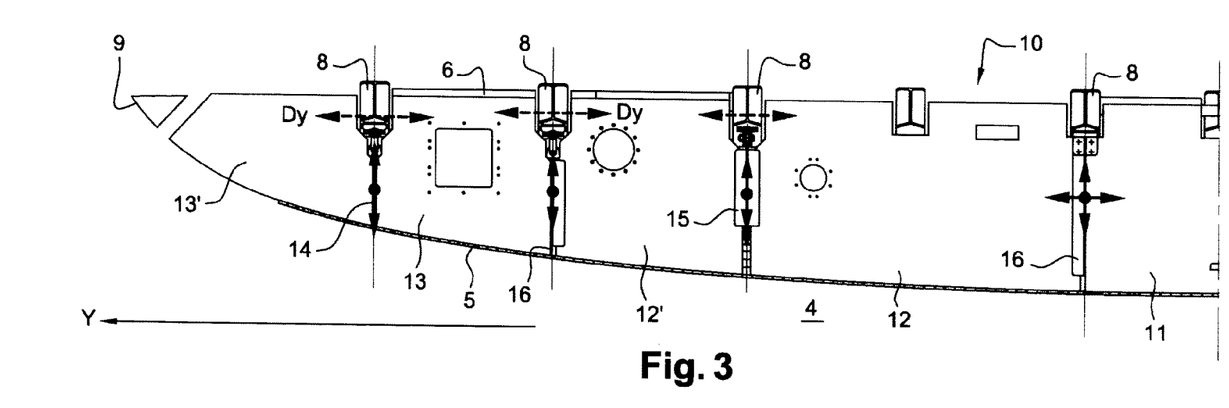
FIG. 3: a partial extension of the partitioning wall of FIG. 2.

FIG. 2 represents a cross-section along the transverse Y axis of the ventral cowling 4 of the aircraft 1. The cross-section is located at the level of a partitioning wall 10 of the invention, located below the wing box of the aircraft 1. FIG. 3 represents an extension of the left portion of the partitioning wall 10, as represented in FIG. 2.

As is seen from FIG. 2, the partitioning wall 10 includes nine vertical panels 11, 12, 12', 13, 13'. More precisely, the partitioning wall 10 includes a central panel 11 bounded on the right and on the left by two intermediary panels 12 and 12' and two exterior panels 13 and 13'. Thus the panels 11, 12, 12', 13, 13' of the partitioning wall are disposed symmetrically with respect to the longitudinal axis X of the aircraft 1. The panels 11, 12, 12', 13, 13' are vertical panels extending the height H of the ventral cowling 4, from the bed 5 of the ventral cowling 4 to the intrados 6 of the wing box located above the ventral cowling 4.

The central panel 11 of the partitioning wall 10 is mounted in a fixed manner, by means of the intermediary of fastenings 7 (FIG. 7) onto the bed 5 of the cowling 4 and onto the two associated vertical dual-function posts 16 which frame it. Similarly, the connection between the central panel 11 and a beam 8 of the wing box located above said central panel 11 is fixed. Thus the central panel 11 is immobilized with respect to the ventral cowling 4 and with respect to the wing box of the aircraft. The central panel 11 takes up the forces along the longitudinal axis X, the transverse axis Y, and the vertical axis Z. The vertical axis Z is understood to be the axis extending along the height H of the ventral cowling 4.

Figure 7:
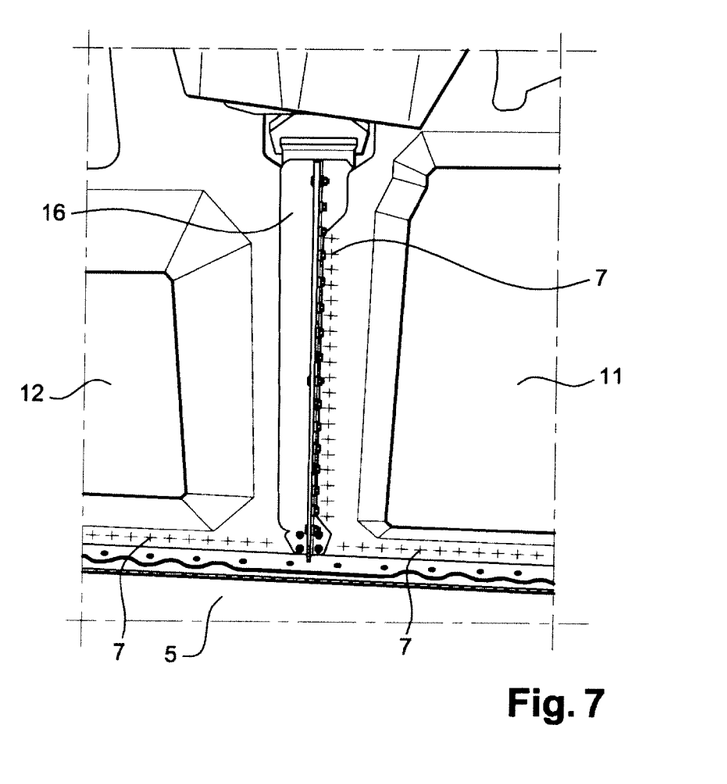
FIG. 7: a schematic representation of a dual-function vertical post, associated with an intermediary panel and with a central panel of the partitioning wall.

The central panel 11 is bounded on each of its two vertical edges by a first intermediary panel 12. Each vertical post 16 associated with the central panel 11 is likewise associated with a first intermediary panel 12. Each of the first intermediary panels 12 is bounded by the central panel 11 on one side and by the second intermediary panel 12' on the other side. A vertical post 15 is disposed between the first 12 and the second 12' intermediary panel. The vertical post 15 associated with the two intermediary panels 12, 12' holds said panels solidly to the remainder of the partitioning wall 10. Moreover, the lower edge of each of the intermediary panels 12, 12' is fixed onto the bed 5 of the ventral cowling 4 by means of fastenings 7 (FIG. 7).

The second intermediary panel 12' is bounded on one of its two vertical edges by a first exterior panel 13, the two panels 12', 13 being held together and to the remainder of the partitioning wall 10 by a vertical dual-function post 16.

The first exterior panel 13 is bounded, at the location of its second vertical edge, by a second exterior panel 13' to which it is linked by a specific vertical post 14. The second vertical edge of the second exterior panel 13' is free, that is, it is not linked to any vertical post or to any panel. Moreover, each of the exterior panels 13, 13' is fixed, by means of fastenings 7 (FIG. 4), onto the bed 5 of the ventral cowling 4 by their lower edge.

The partitioning wall 10 extends the entire width of the ventral cowling 4. The dimensions of the partitioning wall 10 are fixed, in the sense that they do not change during use of the aircraft 1.

The vertical posts 14, 15, 16 associated with the different panels 11, 12, 12', 13, 13' of the partitioning wall 10 provide, in addition to the connection between said panels 11, 12, 12', 13, 13', the connection between the partitioning wall 10 and the intrados 6 of the wing box of the aircraft 1. As the partitioning wall 10 is a unit with the ventral cowling 4, said partitioning wall 10 thus provides the connection between the ventral cowling 4 and the aircraft 1. The vertical posts 14, 15, 16 must provide the rigidity of the partitioning wall 10 in order to maintain the mechanical structure of the ventral cowling 4 but also to allow for transverse elongation along the Y axis of the intrados 6 of the wing box.

Figure 4:
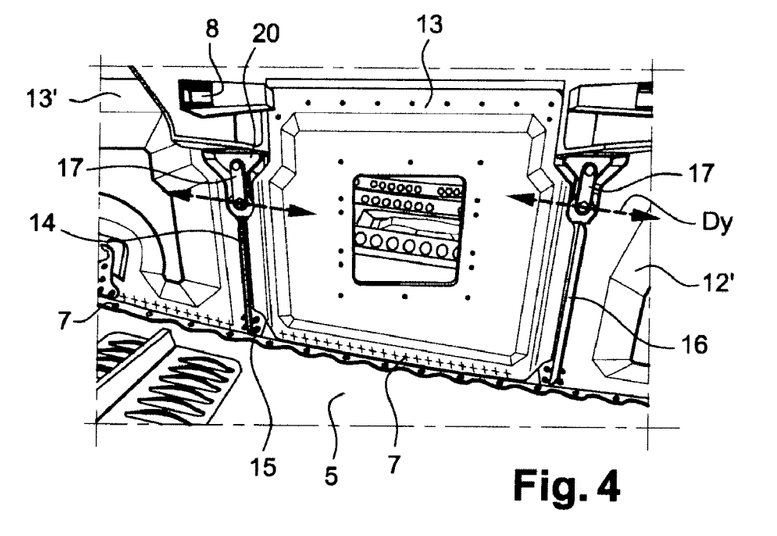
FIG. 4: a schematic representation of an exterior panel of the partitioning wall according to the invention.

As is seen from FIG. 4, the exterior panels 13 and 13' are fixed onto the bed 5 of the ventral cowling 4 by fastenings 7. The first exterior panel 3 is framed by two associated vertical posts 14, 16. The first exterior panel 13 is mounted in a fixed manner on the associated vertical posts 14, 16 over the entire height of said associated vertical posts 14, 16.

The lower end 15 of the vertical posts 14, 16 associated with the first exterior panel 13 is mounted in a fixed manner on the bed 5 of the ventral cowling 4.

Figure 5:
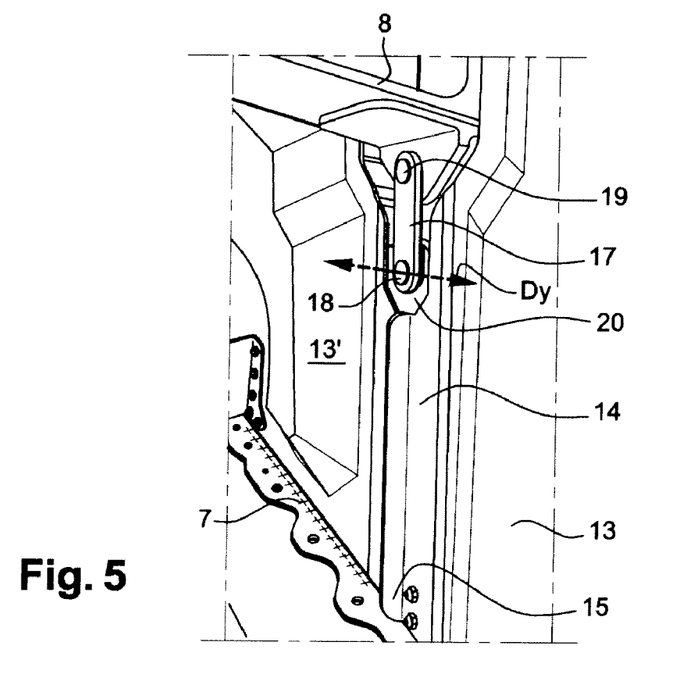
FIG. 5: a representation of a vertical post linking an exterior panel of the partitioning wall to the ventral cowling on one side and to the wing box of the aircraft on the other side.

The upper end 20 of the vertical posts 14, 16 associated with the first exterior panel 13 is linked to a cross-beam 8 belonging to the intrados of the wing box of the aircraft 1. The cross-beam 8 extends parallel to the longitudinal axis X is perpendicular to the partitioning wall 10. The connection between the upper end 20 of the vertical post 14, 16 associated with the first exterior panel 13 of the partitioning wall 10 is provided by a shackle 17. The shackle 17, as represented in FIG. 5, has a general shape of an H providing two points of connection 18, 19. A first connection point 18 is located at the vertical post 14 and a second connection point 19 is located at the beam 8. The double connection 18, 19 of the shackle 17 is a connection in transverse rotation that allows the shackle 17 to swing to the right and to the left of the longitudinal axis X.

Thus the shackle 17 allows a displacement Dy of the cross-beam 8, parallel to the transverse axis Y, while the vertical post 14, 16 as well as the exterior panels 13, 13' with which it is associated remain fixed with respect to the bed 5 of the ventral cowling 4. The intrados of the wing box associated with the beam 8 can thus be elongated parallel to the transverse axis Y without the partitioning wall 10 breaking. Thus, at the intrados zone of the wing box which is most subject to elongation, the longitudinal beam 8 can be displaced in such a way as to permit and to track said elongation. The exterior panels 13, 13' remain fixed, that is, not being subject to elongation the structural strength of the partitioning wall 10 is maintained.

The second exterior panel 13' of the partitioning wall 10 is only bounded vertically by the first exterior partitioning wall 13, its second vertical edge being free. More precisely, the second vertical edge of the second exterior panel 13' extends the length of the outer skin of the wing box. It is possible to provide for fitting the second vertical edge of the second exterior panel 13' with a leaktight joint 9 in order to maintain the leak tightness of the internal volume of the ventral cowling 4 during elongation of the wing box.

Figure 8:
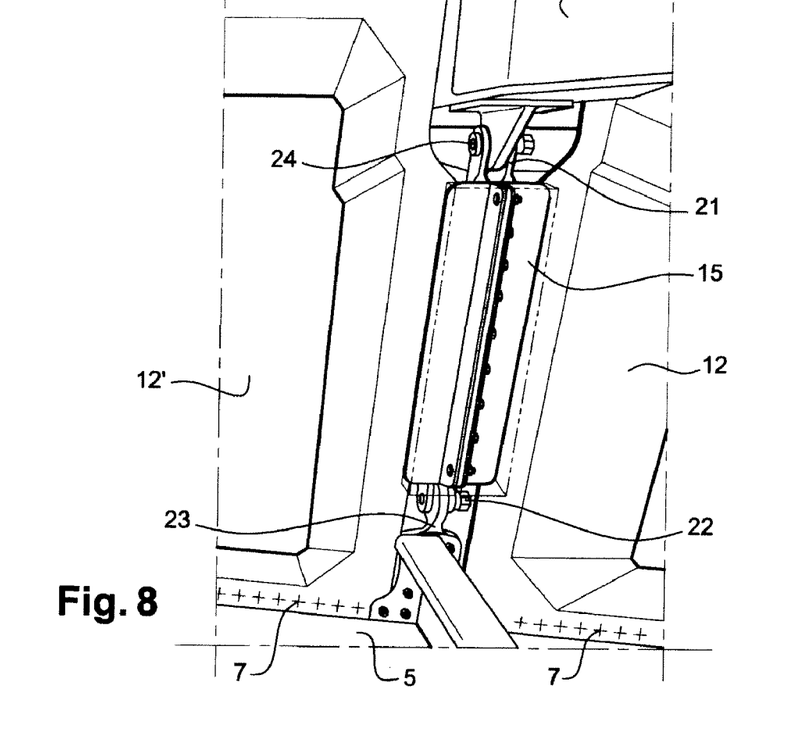
FIG. 8: a schematic representation of a vertical post associated with two intermediary panels of the partitioning wall.
Figure 9:
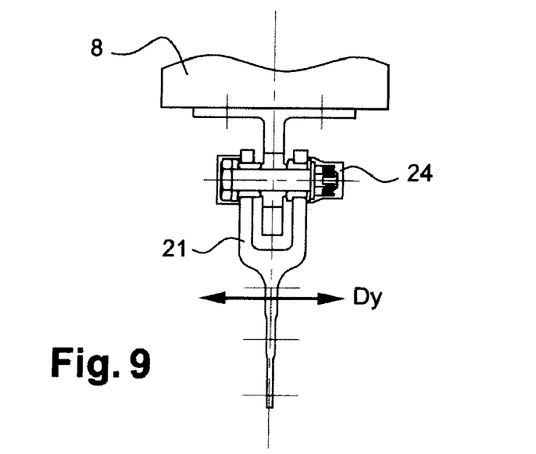
FIG. 9: an extension of the connection between a vertical panel associated with intermediary panels and a beam of the wing box.

As is represented in FIGS. 7 and 8, the intermediary panels 12 and 12' of the partitioning wall 10 are themselves mounted floating on the associated vertical posts 15, 16. For this, the vertical posts 15, 16 associated with the intermediary panels 12 and 12' display, at their connection with said panels, a U-shaped profile between the arms of which the vertical edges of the intermediary panels 12, 12' slide. More precisely, the base of the U-shape profile extends the height of the vertical post 15, 16, the arms of the U-shape extending perpendicularly, in the direction of intermediary panels which they frame. The connection between the vertical posts 15, 16 and the intermediary panels 12, 12' with which they are associated thus allow a deflection, forward and back with respect to the direction of forward motion of the aircraft 1, between the two arms of the U-shape, and from left to right.

Two types of vertical posts 15, 16 are associated with the intermediary panels 12, 12'. Indeed, of the three vertical posts necessary to hold two adjacent intermediary panels 12, 12', only one is linked to the two intermediary panels 12, 12'. The other associated vertical posts 16 are dual-functional, in the sense that they are linked to two panels 12, 12', 11, 13 of different natures. Also, the dual-function vertical posts 16 display a U-shaped profile along only one vertical edge, directed toward the intermediary panel 12, 12', the second vertical edge of said dual-function posts 16 being filled (FIG. 7). The vertical posts 15 associated with two intermediary panels 12, 12', as is depicted in FIG. 8, display a U-shape the length of their two vertical edges, in such a way as to be able to be framed on the right and on the left by an intermediary panel 12, 12'.

The intermediary panels 12, 12' of the partitioning wall 10 are mounted in a fixed manner on the bed 5 of the ventral cowling 4, by means of fastenings 7.

The forces in X to which the intermediary panels 12 and 12' may be subjected are contained and thus taken up by the associated vertical posts 15, 16, and more precisely by the arms of the U-shapes of said vertical posts 15, 16.

As is depicted in FIG. 8, a lower end 23 of the vertical post 15 associated with an intermediary panel 12, 12' is linked to the bed 5 of the ventral cowling 4 by a lower swivel connection 22. Similarly, an upper end 21 of the vertical post 15 associated with an intermediary panel 12, 12' is linked to a beam 8 of the intrados of the wing box extending parallel to the longitudinal axis X of the aircraft 1 by means of an upper swivel connection 24. For example, the swivel connections 22, 24 include an axis of rotation extending parallel to the transverse axis Y of the aircraft 1 and permitting swinging parallel to the longitudinal axis X of the aircraft 1. Thus the forces in X to which the intermediary panels 12, 12' of the partitioning wall 10 are subjected are also taken up by the associated vertical posts 15 thanks to the swivel connections 22, 24 of the vertical post 15.

Figure 6:
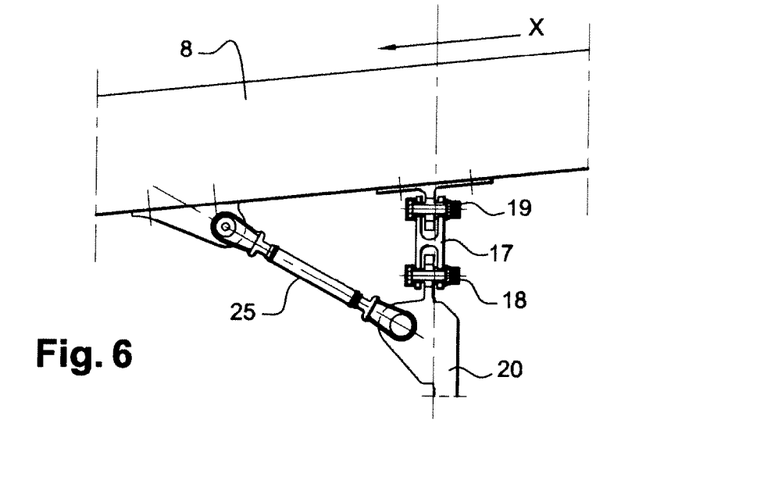
FIG. 6: a schematic sectional representation of the connection between the vertical post associated with an exterior panel and a beam of the wing box.

In the case of the exterior panels 13 and 13' of the partitioning wall, and as depicted in FIG. 6, the forces in X can be taken up thanks to a connecting rod 25, linking the vertical post 14 associated with the exterior panels 13, 13' to the beam 8 of the intrados of the wing box passing between the two exterior panels 13, 13'.

Thus, if the displacements Dy of a beam 8 with respect to the exterior panels 13, 13' are made possible thanks to the shackle 17, the forces in X of the exterior panels 13, 13' are taken up by the connecting rod 24 which accumulates said forces. Thus a triangulation exists for the connection between the vertical post 14 associated with the exterior panels 13, 13' and the beam 8 associated with the intrados 6 of the wing box of the aircraft 1.

The partitioning wall 10 may moreover be subject to forces of compression extending vertically, that is, the height H of the cowling 4. The vertical posts 14, 15, 16 associated with the panels 11, 12, 12', 13, 13' of the partitioning wall 10 are capable of taking up such compression forces.

The partitioning wall 10 according to the invention allows the elongation in Y of the intrados 6 of the wing box located beneath said partitioning wall 10, while taking up the forces of compression and the forces in X to which said partitioning wall 10 may be subjected. Thus the partitioning wall 10 fulfills the functions of compartmentalization of volumes and of mechanical strength of the aerodynamic shape of the ventral cowling 4 while responding to the specific needs flowing from the considerable length of the fuselage 2 of the aircraft 1.

As an advantage, the cowling 4 according to the invention is fitted with two partitioning walls 10 according to the invention, disposed on either side of the wing box of the aircraft 1, no other partitioning wall being disposed between these two partitioning walls 10. Thus at the two ends of the wing box, the connection between the cowling 4 and the fuselage 2 of the aircraft is compatible with elongation of said wing box. It is moreover possible to provide a third partitioning wall, upstream or downstream of the wing box, which does not necessitate any particular connection to it, since any elongation does not occur upstream or downstream of the wing box.

The invention claimed is:

1. A ventral cowling of an aircraft having a wall (10) of vertical partitioning including a plurality of vertical panels, each panel being linked to an adjacent panel by means of a vertical post, characterized by the fact that at least one exterior panel, located at one end of the partitioning wall, is mounted in a fixed manner onto at least one associated vertical post, the upper end of said associated vertical post being fitted with a means of fastening in transverse rotation intended to be fixed to the structure of an aircraft, the means of fastening in transverse rotation being capable of allowing for displacement of the structure of the aircraft with respect to the fixed partitioning wall.

2. A vertical partitioning wall according to the claim 1, characterized by the fact that at least one vertical post associated with an exterior panel includes a means of fastening in translation intended to be linked to the structure of the aircraft, in such a way as to take up the axial forces to which the exterior panel is subjected.

3. A vertical partitioning wall according to claim 1, characterized by the fact that at least one intermediary panel, disposed between an exterior panel and a central panel, is mounted floating on at least one associated vertical post, in such a way as to have a deflection parallel to and perpendicular to the adjacent panels.

4. A vertical partitioning wall according to claim 3, characterized by the fact that the upper end and the lower end of at least one vertical post associated with an intermediary panel are fitted with means of fastening in axial rotation, intended to be fixed respectively to the structure of the aircraft and the ventral cowling.

5. A partitioning wall according to claim 1, characterized by the fact that it includes a central panel mounted in a fixed manner on two associated vertical posts which frame it.

6. An aircraft fitted with a ventral cowling according to claim 1, located below the wing box of the aircraft, at the junction between the wing surface and the fuselage of the aircraft, in which the vertical panels of the partitioning walls are mounted in a fixed manner on the bed of the ventral cowling.

7. A aircraft according to claim 6, characterized by the fact that the upper end of at least one vertical post associated with an exterior panel of the partitioning wall is mounted in transverse rotation onto the wing box of the aircraft, in such a way as to allow for elongation of said wing box parallel to the transverse axis of the aircraft.

8. An aircraft according to claim 6, characterized by the fact that at least one vertical post associated with an exterior panel of the vertical partitioning wall is linked in translation to the wing box, in such a way as to take up the axial forces to which said exterior panel is subjected.

9. An aircraft according to claim 6, characterized by the fact that the upper end and the lower end of at least one vertical post associated with an intermediary panel of the vertical partitioning wall are mounted in axial rotation, respectively, onto the wing box and onto the bed of the ventral cowling, in such a way as to take up the axial forces to which said intermediary panel is subjected.

10. An aircraft according to claim 6, characterized by the fact that the partitioning wall is linked to the wing box by longitudinal beams extending parallel to the longitudinal axis of the aircraft.

* * * * *